(12) United States Patent
Hawes et al.

(10) Patent No.: US 9,750,195 B2
(45) Date of Patent: Sep. 5, 2017

(54) STRAPPING SYSTEM FOR AGRICULTURAL IMPLEMENT

(71) Applicant: CNH Industrial America LLC, New Holland, PA (US)

(72) Inventors: Craig Hawes, Ottertail, MN (US); Dominick Brian Rizzon, Leola, PA (US); Donald P. Keller, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 159 days.

(21) Appl. No.: 14/775,122

(22) PCT Filed: Mar. 14, 2014

(86) PCT No.: PCT/US2014/028555
§ 371 (c)(1),
(2) Date: Sep. 11, 2015

(87) PCT Pub. No.: WO2014/144235
PCT Pub. Date: Sep. 18, 2014

(65) Prior Publication Data
US 2016/0021826 A1 Jan. 28, 2016

Related U.S. Application Data

(60) Provisional application No. 61/798,845, filed on Mar. 15, 2013.

(51) Int. Cl.
*A01F 15/14* (2006.01)
*A01F 15/04* (2006.01)

(52) U.S. Cl.
CPC .............. *A01F 15/14* (2013.01); *A01F 15/04* (2013.01); *A01F 15/042* (2013.01); *A01F 15/145* (2013.01); *A01F 2015/143* (2013.01)

(58) Field of Classification Search
CPC ........ A01F 15/04; A01F 15/14; A01F 15/145; A01F 15/042; A01F 2015/143
(Continued)

(56) References Cited

U.S. PATENT DOCUMENTS 4,157,063 A * 6/1979 Minke ................... A01F 15/145
100/11
4,206,698 A   6/1980 Nicholson
(Continued)

FOREIGN PATENT DOCUMENTS

| CN | 2336564 Y | 9/1999 |
|----|-----------|--------|
| DE | 2253160 A1 | 5/1973 |
| WO | 9313988 A1 | 7/1993 |

OTHER PUBLICATIONS

PCT/US2014/028555, International Search Report, mailed Jul. 22, 2014, 4 pages.
(Continued)

*Primary Examiner* — Jimmy T Nguyen
(74) *Attorney, Agent, or Firm* — Peter K. Zacharias; Patrick M. Sheldrake

(57) ABSTRACT

A strapping system for an agricultural implement includes a strap feeding assembly positioned on a first side of a baling chamber and a rotating gripper assembly positioned on a second side of the baling chamber, opposite the first side. The strapping system also includes a track assembly configured to direct a strap from the strap feeding assembly to the rotating gripper assembly. The rotating gripper assembly is configured to grip the strap while the rotating gripper assembly is in a first orientation, and while the rotating gripper assembly is in a second orientation that enables crop flow in a rearward direction to draw the strap through the strap feeding assembly.

6 Claims, 10 Drawing Sheets

(58) Field of Classification Search
USPC .................... 100/8, 18, 19 R, 20, 21, 23, 24
See application file for complete search history.

(56) References Cited

U.S. PATENT DOCUMENTS

| | | | |
|---|---|---|---|
| 4,466,345 A | | 8/1984 | Kaldenbach |
| 5,347,920 A | * | 9/1994 | Vansteelant ........... A01F 15/145 100/18 |
| 5,377,477 A | | 1/1995 | Haberstroh et al. |
| 5,704,283 A | * | 1/1998 | Wiedel .................. A01F 15/146 100/11 |
| 6,487,833 B1 | | 12/2002 | Jaenson et al. |
| 7,526,995 B2 | | 5/2009 | Actis et al. |
| 7,841,272 B2 | | 11/2010 | Actis et al. |
| 8,127,669 B2 | | 3/2012 | Doyle et al. |
| 8,327,759 B2 | | 12/2012 | Doyle et al. |

OTHER PUBLICATIONS

PCT/US2014/028555, Written Opinion, mailed Jul. 22, 2014, 6 pages.

* cited by examiner

STRAPPING SYSTEM FOR AGRICULTURAL IMPLEMENT

CROSS REFERENCE TO RELATED APPLICATION

This application is the US National Stage filing of International Application Ser. No. PCT/US2014/028555 filed on Mar. 14, 2014 which claims priority to U.S. Provisional Application Ser. No. 61/798,845, entitled "STRAPPING SYSTEM FOR AGRICULTURAL IMPLEMENT," filed Mar. 15, 2013, each of which is hereby incorporated by reference in its entirety.

BACKGROUND OF THE INVENTION

The present invention relates generally to the field of packaging compressible materials, and more particularly, to systems for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

SUMMARY OF THE INVENTION

In one embodiment, a strapping system for an agricultural implement includes a strap feeding assembly positioned on a first side of a baling chamber and a rotating gripper assembly positioned on a second side of the baling chamber, opposite the first side. The strapping system also includes a track assembly configured to direct a strap from the strap feeding assembly to the rotating gripper assembly. The rotating gripper assembly is configured to grip the strap while the rotating gripper assembly is in a first orientation for receiving the strap, and while the rotating gripper assembly is in a second orientation that enables crop flow in a rearward direction to draw the strap through the strap feeding assembly.

In another embodiment, a strapping system for an agricultural implement includes a slot formed on a material-facing surface of a forward plunger, the slot being configured to direct a strap from a first side of a baling chamber to a second side of the baling chamber. A rotating gripper assembly is positioned on the second side of the baling chamber and is configured to rotate from a first orientation for receiving the strap from the slot to a second orientation that enables transfer of the strap to a gripping assembly of a needle.

In a further embodiment, a strapping system for an agricultural implement a rotating gripper assembly configured to receive a portion of a strap and to rotate the strap toward a rear end of the baling chamber as a compressible material collects in the baling chamber. A needle is provided, the needle having a gripping assembly configured to capture the strap from the rotating gripper assembly while the strap is rotated toward the rear end of the baling chamber, and to transfer an end of the strap across the baling chamber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems for strapping a bale of material using a relatively high-strength strap. In particular, various components are provided within a baler to efficiently surround the bale with the strap and to seal the strap securely around the bale. The described embodiments may provide certain advantages over traditional baling systems that use twine to contain bales. For example, the high strength and/or the large surface area of the strap may enable the strap to hold the bale in the desired size and density more efficiently than twine, thereby facilitating easy storage and handling of the bale. Additionally, unlike twine, the strap may be easily removed from the bale during subsequent processing operations. Furthermore, certain components described herein (such as, for example, grippers and gripping assemblies) may enable efficient strapping of the bale, while substantially reducing or eliminating twisting of the strap as the strap is applied to and sealed around the bale.

Figure 1:
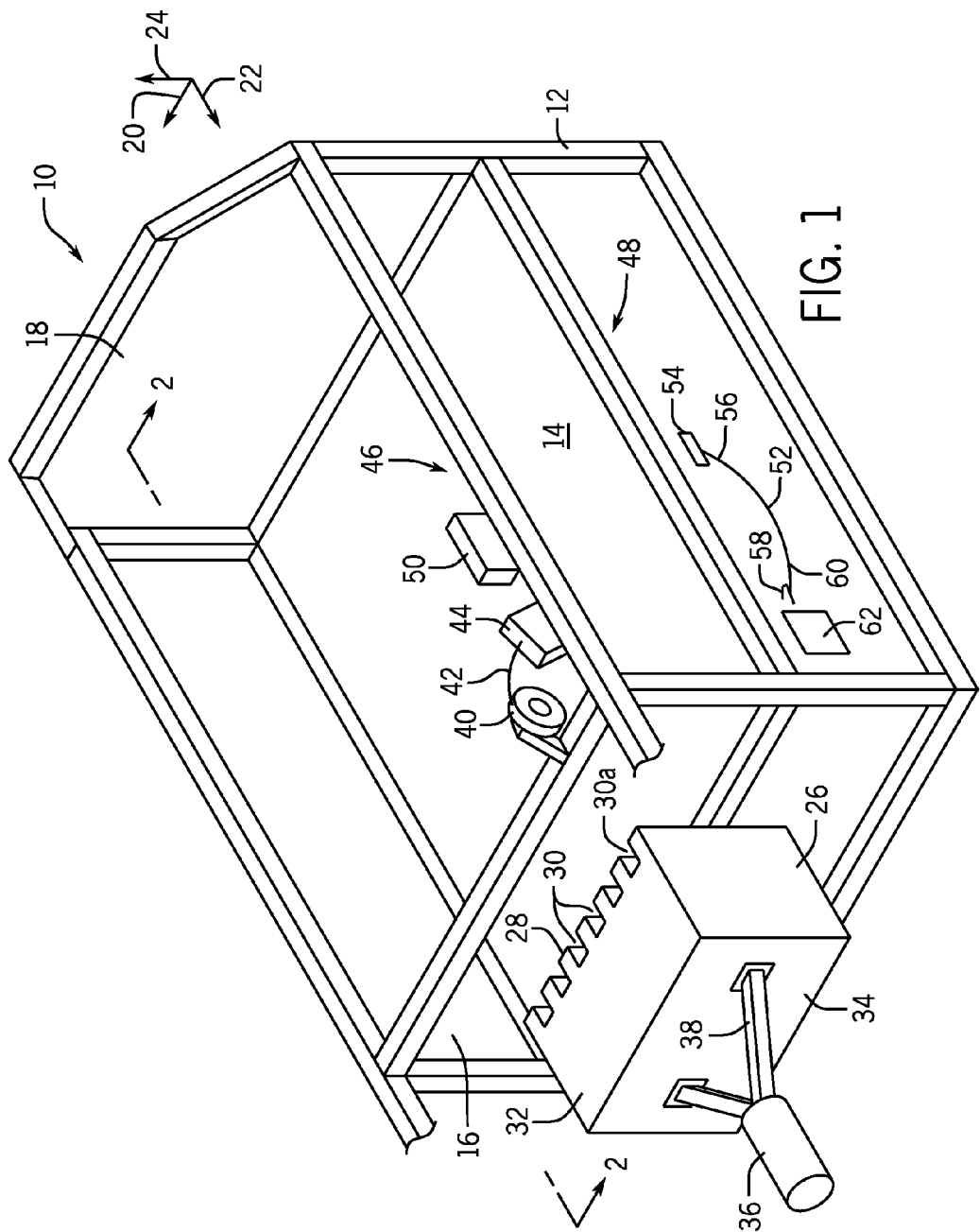
FIG. 1 is a perspective view of an embodiment of a portion of a baler.

FIG. 1 is a perspective view of an embodiment of a portion of an agricultural baler 10 configured to form and to strap rectangular bales of material (e.g., crop materials, such as hay, straw, grasses, silage, corn stalks, tobacco, cotton, biomass, etc.). In the illustrated embodiment, the baler 10 includes a frame 12 defining a baling chamber 14. The baling chamber 14 has a forward end 16 (e.g., a first end) and a rear end 18 (e.g., a second end), which generally relate to the direction of travel of the baler 10. For example, the baler 10 may be part of a towed implement, which is coupled to a tow vehicle and pulled through a field, thereby enabling the baler 10 to collect and bale the material as the towed implement travels through the field. When connected to the tow vehicle, the forward end 16 is proximal to the vehicle, while the rear end 18 is distal from the vehicle. The baler 10 may also be included in a self-propelled chassis, or may be part of a self-contained vehicle. As used herein, the term agricultural implement includes a wide variety of devices, including towed implements, self-propelled chassis, and self-contained vehicles. The baler 10 may be further defined as having a lateral axis 20, a longitudinal axis 22, and a vertical axis 24. Although the illustrated embodiment includes a horizontal baler 10, it should be understood that the systems disclosed herein may be readily adapted for use in other types of balers, such as vertical balers. Additionally, although the illustrated embodiments show systems for strapping the bale about the lateral axis 20, it should be understood that the systems disclosed herein could also be readily adapted for strapping the bale about the longitudinal axis 22 or the vertical axis 24.

In the baler 10 of FIG. 1, the material is compressed within the baling chamber 14 by a forward plunger 26. In the illustrated embodiment, the forward plunger 26 includes a material-facing surface 28 having multiple parallel slots 30 open to the baling chamber 14. As illustrated, the slots 30 extend from a first end 32 (e.g., top end) of the forward plunger 26 to a second end 34 (e.g., bottom end) of the forward plunger 26, and the slots 30 are generally aligned with the vertical axis 24 of the baler 10. The slots 30 are spaced evenly across the material-facing surface 28 of the forward plunger 26. As shown, six slots are provided on the material-facing surface 28 of the forward plunger 26, although two, three, four, five, seven, eight, nine, ten, or more slots may be provided in other embodiments. The forward plunger 26 is configured to move axially within the baling chamber 14 in a reciprocating motion along the longitudinal axis 22 of the baler 10. The forward plunger 26 is coupled to an actuator 36 via one or more arms 38. The actuator 36 may be a hydraulic cylinder or a pneumatic cylinder, or the actuator 36 may include a flywheel that drives a gearbox. The gearbox may, in turn, rotate crank arms that are coupled to the arms 38 to facilitate movement of the forward plunger 26. Regardless of its form, the actuator 36 is configured to control the reciprocating motion of the forward plunger 26. In the illustrated embodiment, the baler 10 includes a spool 40 configured to store and/or to provide a strap 42 for strapping the material. In certain embodiments, the spool 40 may be accessible and/or removable for replacement or installation of the strap 42. As illustrated, the spool 40 provides the strap 42 to a strap feeding assembly 44, which is configured to direct and/or to propel the strap 42. For example, in certain embodiments, the strap feeding assembly 44 may propel the strap 42 from a first side 46 (e.g., top side) of the baling chamber 14 to a second side 48 (e.g., bottom side) of the baling chamber 10, opposite the first side 46. In some embodiments, the strap feeding assembly 44 may propel the strap 42 from the first side 46 to the second side 48 via the slots 30 of the forward plunger 26, as discussed in more detail below.

In the illustrated embodiment, the baler 10 includes a sealing assembly 50, which is configured to receive and/or to capture the strap 42 and to seal one portion of the strap 42 to another portion of the strap 42 to form the strap 42 into a sealed loop around the bale, as described in more detail below. In certain embodiments, one or more of the spool 40, the strap feeding assembly 44, and the sealing assembly 50 may be coupled to the frame 12 (e.g., on the first side 46 or the second side 48 of the baling chamber) of baler 10. Furthermore, in some embodiments, the spool 40, the strap feeding assembly 44, and/or the sealing assembly 50 may be disposed on the same side, such as on the first side 46, of the baling chamber 14. Although one spool 40, one strap feeding assembly 44, and one sealing assembly 50 are shown in FIG. 1 for clarity, it should be understood that additional components may be provided within the system to surround the bale with multiple straps, in some embodiments. For example, as shown, the spool 40, the strap feeding assembly 44, and the sealing assembly 50 are aligned with a first slot 30a. However, a separate spool 40, strap feeding assembly 44, and/or sealing assembly 50 may be provided and aligned with each of the slots 30 of the forward plunger 26. Thus, multiple straps 42 may be directed through the slots 30 of the forward plunger 26 and sealed around the bale, as described in more detail below.

In the illustrated embodiment, the baler 10 includes a needle 52, which may be generally disposed on the second side 48 of the baling chamber 14. The needle 52 is configured to move through the baling chamber 14, and in some embodiments, the needle 52 may move through the baling chamber 14 on an arc. In the illustrated embodiment, the needle 52 is configured to rotate about an attachment 54 at a first end 56 of the needle 52 as the needle 52 moves through the baling chamber 14. Additionally, in certain embodiments, the needle 52 may be coupled to a gripping assembly 58 disposed generally near (e.g., proximal to) a second end 60 of the needle 52. The gripping assembly 58 of the needle 52 may be configured to receive and to grip the strap 42. The needle 52 may have any of a variety of configurations and may serve any of a variety of functions, as described in more detail below. For example, the needle 52 may be configured to transport the strap 42 from the second side 48 to the first side 46 of the baling chamber 14 to wrap the strap 42 around a bale, and to transfer the strap 42 to the sealing assembly 50. The needle 52 may additionally or alternatively be configured to transport or guide the strap 42 from the first side 46 to the second side 48 of the baling chamber 14 to position the strap 42 for strapping a subsequent bale within the baling chamber 14.

Additionally, in the illustrated embodiment, the baler 10 includes a rotating gripper assembly 62. As depicted in the embodiment of FIG. 1, the rotating gripper assembly 62 is disposed on the second side 48 of the baling chamber 14 and is generally forward of the needle 52 along the longitudinal axis 22. In some embodiments, the rotating gripper assembly 62 may be coupled to the frame 12. The rotating gripper assembly 62 is configured to receive and to capture the strap 42, and to rotate from a first orientation to a second orientation, as described below. As noted above, although only one needle 52 and one rotating gripper assembly 62 are illustrated for clarity, it should be understood that multiple needles 52 and rotating gripper assemblies 62 may be provided within the system to surround the bale with multiple straps 42. For example, one needle 52 and one rotating gripper assembly 62 are shown as aligned with one slot 30a; however, a separate needle 52 and rotating gripper assembly 62 may be provided for, and aligned with, each of the slots 30 formed in the forward plunger 26, in some embodiments.

Additionally, as noted above, although the illustrated embodiments show systems for strapping the bale about the lateral axis 20 of the baler 10, it should be understood that the systems disclosed herein may be readily adapted for strapping the bale about the longitudinal axis 22 or the vertical axis 24. For example, to strap the bale about the vertical axis 24, the slots 30 may extend across the material-facing surface 28 of the forward plunger 26 such that the slots 30 are aligned with the lateral axis 20 of the baler 10 and are parallel to the top end 32 and to the second end 34 of the forward plunger 26. In such configurations, the strap 42 may be propelled through the slots 30 laterally 20 across the baling chamber 14 from a first side (e.g., adjacent to a first vertical or side wall) to a second side (e.g., adjacent to a second vertical or side wall, opposing the first vertical or side wall) of the baling chamber 14. The spool 40, the strap feeding assembly 44, and/or the sealing assembly 50 may be disposed on the first side (e.g., proximate to a first vertical or side wall) of the baling chamber 14, and the needle 52 may be disposed on the second side (e.g., proximate to a second vertical or side wall) of the baling chamber 14. The components may function together to surround the bale with the strap 42 about the vertical axis 24 of the baler 10 in a similar manner as described herein, although the components and system may be oriented and adapted for strapping the bale about the vertical axis 24.

The strap 42 may be formed from any suitable high-strength material. For example, the strap 42 may have a strength of about 150 kilograms-force (kgf) to about 1500 kgf. In some embodiments, the strap 42 may have a strength of about 300 kgf to about 1200 kgf. The strap 42 may be any suitable width, although the strap 42 may be about 1 centimeter (cm) to about 5 cm wide, in some embodiments. In certain embodiments, the strap 42 may be formed from carbon steel or plastics, such as polypropylene or polyester. In some embodiments, the baler 10 is configured to form bales that are about 2 to about 3 meters long (along the longitudinal axis 22) by about 1 to about 2 meters wide (along the lateral axis 20) by about 0.5 to about 1 meter tall (along the vertical axis 22), and the strap 42 is of a suitable strength to securely strap bales of this size.

Figure 2:
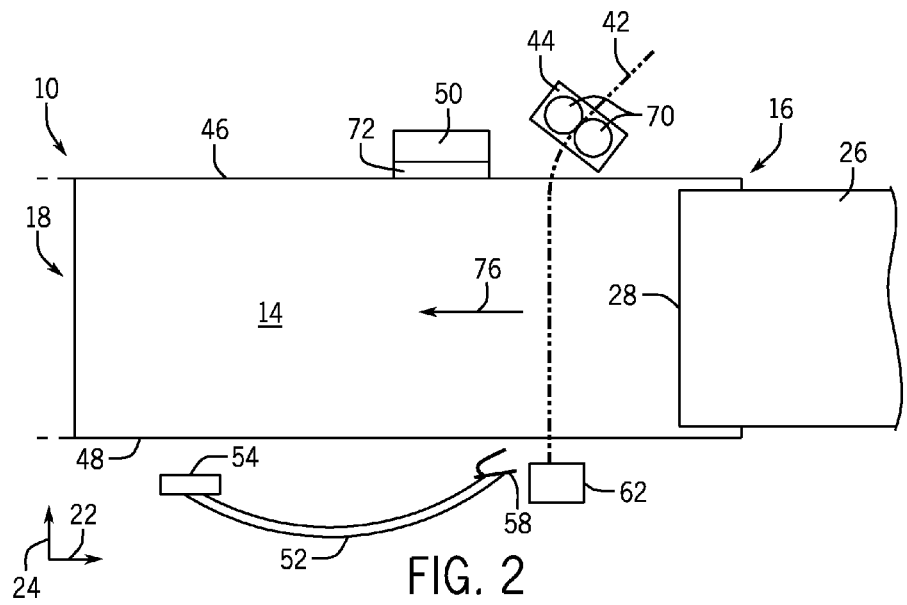
FIG. 2 is a side cross-sectional view of an embodiment of a baler having a strap extending from a first side of a baling chamber to a second side of the baling chamber prior to strapping a bale.

FIG. 2 illustrates a side cross-sectional view of an embodiment of the baler 10 having the strap 42 extending from the first side 46 of a baling chamber 14 to the second side 48 of the baling chamber 14 prior to strapping the bale. As shown, the baler 10 is configured to receive the material and to compress the material into the bale within the baling chamber 14. The strap feeding assembly 44 and the sealing assembly 50 are disposed on the first side 46 of the baling chamber 14. The needle 52 and the rotating gripper assembly 62 are disposed on the second side 48 of the baling chamber 14. At this stage in the strapping process, the strap 42 extends through the baling chamber 14 from wheels 70 of the strap feeding assembly 44 to the rotating gripper 62. The needle 52 includes a gripping assembly 58 that is in a configuration (e.g., open) to receive a portion of the strap 42. The sealing assembly 50 includes a mandrel 72 which is also in a configuration (e.g., open) to receive the strap 42.

The material may flow into the baling chamber 14 through the forward end 16 and the forward plunger 26 may move in a rearward direction 76 along the longitudinal axis 22 to compress the material within the baling chamber 14. More particularly, the forward plunger 26 may compress the material toward or against the rear end 18 of the baling chamber 14. In certain embodiments, the rear end 18 includes a stationary wall, although in other embodiments the rear end 18 may include a rear plunger configured to provide a means to control the size and/or density of the bale. As the material accumulates in the baling chamber 14, the material urges (e.g., moves, pushes) the strap 42 to wrap around a rear portion of the material and to move generally rearwardly as indicated by arrow 76. In other words, as the material accumulates in the baling chamber 14, the strap 42 captures and wraps around a rear portion of the crop flow.

Figure 3:
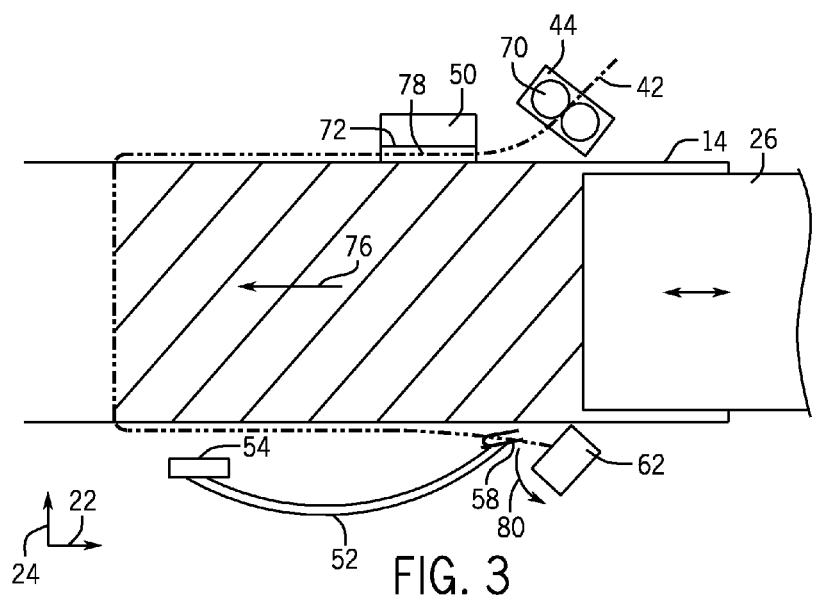
FIG. 3 is a side cross-sectional view of the baler of FIG. 2, wherein the strap extends rearwardly around a portion of a compressible material within the baling chamber as the material collects within the baling chamber.

FIG. 3 is a side cross-sectional view of the baler of FIG. 2, wherein the strap 42 extends rearwardly around a portion of a compressible material within the baling chamber 14 as the compressible material collects within the baling chamber 14. The strap feeding assembly 44 may enable the strap 46 to be pulled around the material within the baling chamber 14, and the strap feeding assembly 44 may provide resistance or tension to the strap 46 as material accumulation within the baling chamber 14 draws the strap 46 rearwardly around the material. As illustrated in FIG. 3, as the strap 42 moves rearwardly 76, a portion 78 of the strap 42 is directed to and received (e.g., captured) by the mandrel 72 of the sealing assembly 50. Additionally, the rotating gripper assembly 62 rotates from a first orientation to a second orientation as indicated by arrow 80, thus rotating the strap 42 rearwardly (e.g., toward the needle 52 and/or toward the rear end 18 of the baling chamber 14). In certain embodiments, the rotating gripper assembly 62 may be mounted on a spring (e.g., torsion spring), and thus, the rotating gripper assembly 62 may rotate due to a force applied by the strap 42 as the strap 42 is pulled rearwardly by the material accumulating within the baling chamber 14. In other embodiments, the rotating gripper assembly 62 may be powered, such that the rotation is driven by electrical power, for example. As the rotating gripper assembly 62 rotates from the first orientation to the second orientation, the strap 42 engages the gripping assembly 58 on the needle 52. Upon the strap 42 engaging the gripping assembly 58 on the needle 52, the gripping assembly 58 may capture (e.g., grip, clamp, hold, etc.) the strap 42. The gripping assembly 58 may include a sensor configured to detect the strap 42 within the gripping assembly 58. In such a configuration, the gripping assembly 58 is configured to close when the strap 42 is sensed within or on the gripping assembly 58. In some embodiments, the gripping assembly 58 may close automatically when the rotating gripper assembly 62 reaches the second orientation. In certain embodiments, after the gripping assembly 58 captures the strap 42, the rotating gripper assembly 62 may release the strap 42. Thus, the rotating gripper assembly 62 may transfer the strap 42 to the gripping assembly 58 of the needle 52 as, or after, the rotating gripper assembly 62 rotates from the first orientation to the second orientation.

Figure 4:
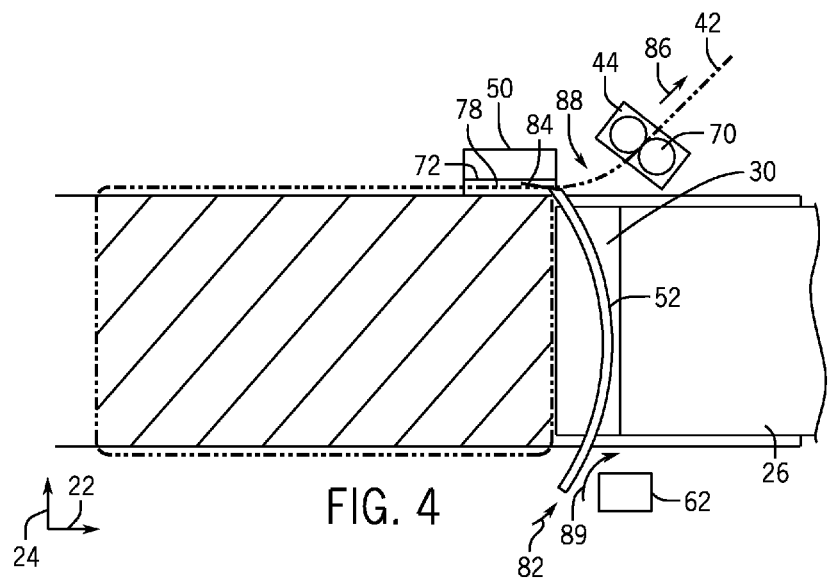
FIG. 4 is a side cross-sectional view of the baler of FIG. 2, wherein a needle extends through the baling chamber to surround the bale with the strap.

Once the bale within the baling chamber 14 reaches a desired size and/or density, the strapping process may be completed. FIG. 4 is a side-cross sectional view of the baler of FIG. 2, wherein the needle 52 extends through (e.g., across) the baling chamber 14 to surround the bale with the strap 42. In other words, the gripping assembly 58 of the needle 52 grips the strap 42, and the needle 52 moves (e.g., rotates, etc.) through the baling chamber 14 as indicated by arrow 82. Thus, the needle 52 brings the strap 42 from the second side 48 of the baling chamber 14 to the first side 46 of the baling chamber 14. In certain embodiments, the needle 52 may move between the second side 48 and first side 46, or vice versa, through the slots 30 of the forward plunger 26. Such a configuration provides a path for the needle 52 to move through the baling chamber 14 and enables the forward plunger 26 to maintain contact with (e.g., engage) the bale, thereby maintaining the shape of the bale while the needle 52 moves the strap 42 around the bale.

In the illustrated embodiment, the needle 52 directs or transfers an end 84 of the strap 42 into the sealing assembly 50. In some embodiments, the end 84 of the strap 42 may extend approximately 30 cm or less from the gripping assembly 58. When the end 84 of the strap 42 is transferred to the sealing assembly 50, the gripping assembly 58 of the needle 52 releases the strap 42. The sealing assembly 50 holds the received end 84 of the strap 42 and brings the end 84 into contact with the portion 78 of the strap 42 already disposed within the sealing assembly 50. In certain embodiments, the strap feeding assembly 44 may retract (e.g., pull back) on the strap 42 as indicated by arrow 86, thus tightening the strap 42 around the bale prior to the strap 42 being sealed. The sealing assembly 50 may seal the end 84 to the portion 78 of the strap 42, thus sealing the strap 42 into a loop around the bale within the baling chamber 14.

The sealing assembly 50 may also cut the strap 42, thus releasing the strap 42 from the sealing assembly 50 so that the strapping process may be repeated for another bale. In some embodiments, after the strap 42 is cut, the strap feeding assembly 50 may retract (e.g., pull back) the strap 42 as indicated by arrow 86 to shorten a free end 88 of the strap 42 and to better align and position the free end 88 of the strap 42 for transport from the first side 46 to the second side 48 of the baling chamber 14. As described in detail below, the free end 88 of the strap 42 may be moved from the first side 46 to the second side 48 of the baling chamber 14 through any of a variety of methods. For example, the free end 88 may be fed through the slot 30 on the forward plunger 26, or the free end 88 may be fed through a track assembly (e.g., a track assembly disposed within the slot 30 or disposed within the needle 52). In some embodiments, the free end 88 may be moved from the first side 46 to the second side 48 of the baling chamber 14 by the needle 52. Additionally, the rotating gripper assembly 62 may rotate from the second orientation to the first orientation as indicated by arrow 89 in preparation for receiving the free end 88 of the strap 42 and for strapping another bale.

Figure 5:
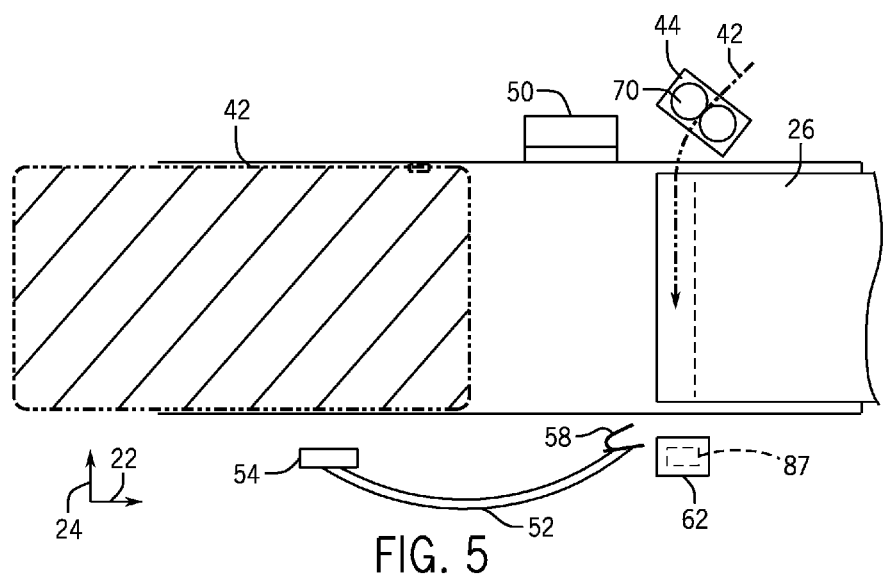
FIG. 5 is a side cross-sectional view of the baler of FIG. 2 after the bale is strapped, wherein the strap is fed through a slot of a forward plunger from the first side of the baling chamber to the second side of the baling chamber in preparation for strapping another bale.

FIG. 5 is a side cross-sectional view of the baler of FIG. 2 after the bale is strapped, wherein the strap 42 is fed through the slot 30 of the forward plunger 26 from the first side 46 to the second side 48 of the baling chamber 14 in preparation for strapping another bale. FIG. 5 also illustrates the strapped bale being removed (e.g., dropped, ejected, transferred, etc.) from the baling chamber 14. As noted above, to prepare for strapping material into another bale, the strap feeding assembly 44 directs or propels the strap 42 from the first side 46 of the baling chamber 14 to the second side 48 of the baling chamber 14. In the depicted embodiment, the strap feeding assembly 44 propels the strap 42 through the slots 30 on the material-facing surface 28 of the forward plunger 26 to the rotating gripper assembly 62. The slot 30 may be positioned to align with the strap feeding assembly 44 and the rotating gripper assembly 62, thus facilitating the transfer of the strap 42 from the strap feeding assembly 44 to the rotating gripper assembly 62. In certain embodiments, the strap feeding assembly 44 may be configured to propel the strap 42 from the first side 46 to the second side 48 of the baling chamber through the slot 30 in less than 5 seconds, 3 seconds, 1 second, or 0.5 seconds. The strap feeding assembly 44 may feed a preset length of strap 42 through the baling chamber 14 to the rotating gripper assembly 62, or the strap feeding assembly 44 may feed the strap 42 until a sensor 87 within the rotating gripper assembly 62 detects the presence of the strap 46 within the rotating gripper assembly 62.

Figure 6:
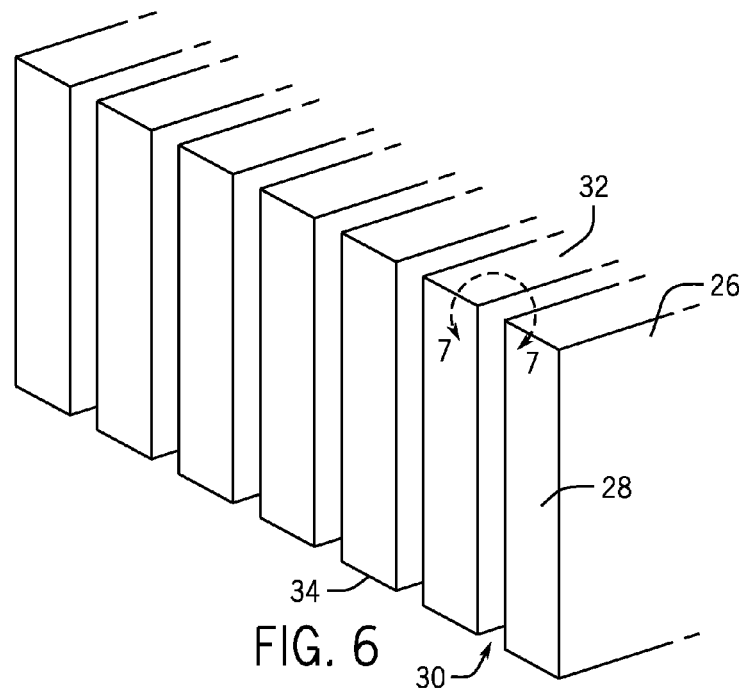
FIG. 6 is a front perspective view of an embodiment of the forward plunger having multiple slots formed on a material-facing surface of the forward plunger.

FIG. 6 is a front perspective view of an embodiment of the forward plunger 26 having multiple slots 30 formed on a material-facing surface 28 of the forward plunger 26. As discussed above, the slots 30 are configured to direct and/or guide the strap 42 from the first side 46 to the second side 48 of the baling chamber 14. In some embodiments, the slots 30 are configured to facilitate movement of the needle 52 from the first side 46 to the second side 48 (or vice versa) of the baling chamber 14. More particularly, the slots 30 extend from the first end 32 (e.g., top end) of the forward plunger 26 to the second end 34 (e.g., bottom end) of the forward plunger 26, and the slots 30 are generally aligned with the vertical axis 24 of the baler 10. The slots 30 may be spaced substantially evenly across the material-facing surface 28 of the forward plunger 26.

Figure 7:
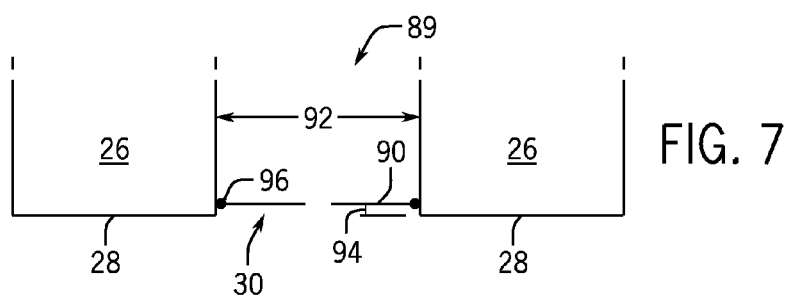
FIG. 7 is a cross-sectional view of a portion of the forward plunger of FIG. 6, illustrating an embodiment of a track assembly having a gate disposed within a slot of the forward plunger.

FIG. 7 is a cross-sectional view of a portion of the forward plunger 26 of FIG. 6 taken within 7-7, illustrating an embodiment of a track assembly 89 having a gate 90 disposed within the slot 30 of the forward plunger 26. As shown, the gate 90 extends across the width 92 of the slot 30. The gate 90 may be aligned with the material-facing surface 28 of the forward plunger 26, or the gate 90 may be recessed within the slot 30 at a distance 94 from the material-facing surface 28 of the forward plunger 26, as illustrated. Recessing the gate 90 from the material-facing surface 28 of the forward plunger 26 may enable the gate 90 to open more easily without interference from material within the baling chamber 14, for example. The gate 90 is coupled to the slot 30 by hinges 96, which may be spring-loaded and may generally be configured to release the strap 42 from the slot 30 as the strap 42 moves rearwardly. In some embodiments, the gate 90 may be actuated, and the gate 90 may be configured to open at a certain time (e.g., after the strap 42 is received and gripped by the rotating gripper assembly 62).

Figure 8:
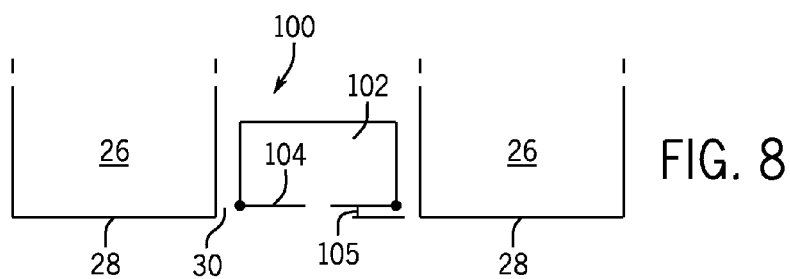
FIG. 8 is a cross-sectional view of a portion of the forward plunger of FIG. 6, illustrating another embodiment of a track assembly disposed within the slot of the forward plunger.

FIG. 8 is a cross-sectional view of a portion of the forward plunger 26 of FIG. 6, illustrating an embodiment of a self-contained track assembly 100 disposed within the slot 30 of the forward plunger 26. The track assembly 100 is configured to direct and/or to guide the strap 42 from the first side 46 to the second side 48 of the baling chamber 14. Providing the track assembly 100 within the slot 30 (as opposed to using the slot 30 itself to guide the strap 42, for example) may be desirable in certain cases. For example, the track assembly 100 may be formed from materials (e.g., high-strength materials) that may be configured to reduce wear from the movement of the straps 42 through the track assembly 100. The track assembly 100 may also be repaired or replaced should a portion of the track assembly 100 become worn over time, without the need to replace the forward plunger 26, for example. In the illustrated embodiment, the track assembly 100 may be coupled to the forward plunger 26, and thus, the forward plunger 26 may support the track assembly 100. In some embodiments, the track assembly 100 extends from the first end 32 to the second end 34 of the forward plunger 26.

As shown in FIG. 8, the track assembly 100 includes a channel 102 and a gate 104. The gate 104 is configured to retain the strap 42 within the channel 102 as the strap 42 is propelled through the channel 102. The gate 104 may be aligned with the material-facing surface 28 of the forward plunger 26, or the gate 104 may be recessed within the slot 30 at a distance 105 from the material-facing surface 28 of the forward plunger 26, as illustrated. Recessing the gate 104 from the material-facing surface 28 of the forward plunger 26 may enable the gate 104 to open more easily without interference from material within the baling chamber 14, for example. The gate 104 may be spring-loaded and may generally be configured to release the strap 42 from the channel 102 as the strap 42 moves rearwardly. In some embodiments, like the gate 90 described above, the gate 104 may be actuated and the gate 104 may be configured to open at a certain time (e.g., after the strap 42 is received and captured by the rotating gripper assembly 62).

Thus, the strap 42 may be directed from the first side 46 to the second side 48 (or vice versa) of the baling chamber 14 via the slot 30, and in certain embodiments, the slot 30 may include the track assembly 89, 100 to guide and maintain the strap 42 within the slot 30. Furthermore, the track assembly 89, 100 may be segmented along the vertical axis 24 of the baling chamber 14 (e.g., the track assembly 89, 100 may not be continuous between the first end 32 and the second end 34 of the forward plunger 26). Such segmentation may use less material than a continuous track assembly, thereby lowering costs, lowering weight, and providing easier replacement. The segmentation may also facilitate efficient strapping of the bale. More particularly, if the track assembly 89, 100 is vertically segmented, the track assembly 89, 100 may capture and direct the end 84 of the strap 42 as the needle 52 transports the strap 42 from the second side 48 to the first side 46 of the baling chamber 14. For example, the end 84 of the strap 42 may be held by the gripping assembly 58 at the second end 60 of the needle 52. Therefore the end 84 of the strap 42 may enter the track assembly 89, 100 as the needle 52 moves through the slot 30. The gates 90, 104 may be then closed, thereby maintaining the end 84 of the strap 42 within the slot 30. However, as the needle 52 moves through the slot 30, the gates 90, 104 may open due to contact with the needle 52, thereby enabling the strap 42 to be tightened against the bale. However, due to the segmentation of the track assembly 89, 100 and/or the configuration of the needle 52, the gates 90, 104 remain closed until the end 84 of the strap 42 has entered the next segment of the track assembly 89, 100. Therefore, the segmented track assembly 89, 100 facilitates transferring the free end 84 of the strap 42 through slot 30, while also enabling the strap 42 to wrap around the bale as the gates 90, 104 open as the needle 52 moves through the slot 30.

Figure 9:
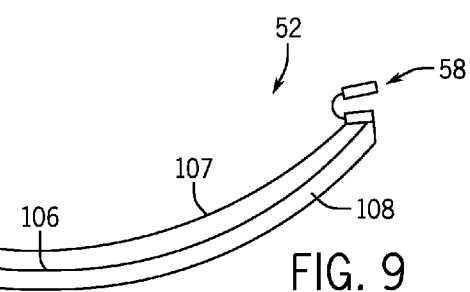
FIG. 9 is a side cross-sectional view of an embodiment of a hollow needle.

FIG. 9 is a side cross-sectional view of an embodiment of the needle 52, in which the needle 52 is hollow. The hollow needle 52 is configured to facilitate actuation of the gripping assembly 58 disposed near the second end 60 of the needle 52. In the illustrated embodiment, the gripping assembly 58 may be actuated by any suitable mechanism, such as by a cable 106 disposed within the needle 52. Thus, as shown, the needle 52 includes an outer wall 107 defining an inner cavity 108 extending along the length of the needle 52, and the cable 107 is disposed within the inner cavity 108. The cable 106 may actuate the gripping assembly 58 electronically or mechanically (e.g., hydraulically, pneumatically, or by movement of the cable). For example, the cable 106 may be a pneumatic conduit that provides air to a pneumatic actuator disposed in the gripping assembly 58. In other embodiments, the cable 106 extends from a pneumatic actuator to the gripping assembly 58. In such embodiments, movement of the pneumatic actuator drives the cable to actuate the gripping assembly 58. In some embodiments, a solenoid or a linear actuator may drive the cable 106 to actuate the gripping assembly 58. The solenoid or linear actuator may be disposed proximate to the attachment 54. In embodiments having the linear actuator, a two position air valve may be utilized to power the cable 106. Thus, the cable 106 may drive the gripping assembly 58 to grip the strap 42. Similarly, when the strap 42 is fed into the sealing assembly 50, the cable 106 may drive the gripping assembly 58 to release the strap 42. The hollow needle 52 may have any suitable shape. For example, the needle 52 may have a generally cylindrical or annular horizontal cross-section and may have a curvature along its length.

Figure 10:
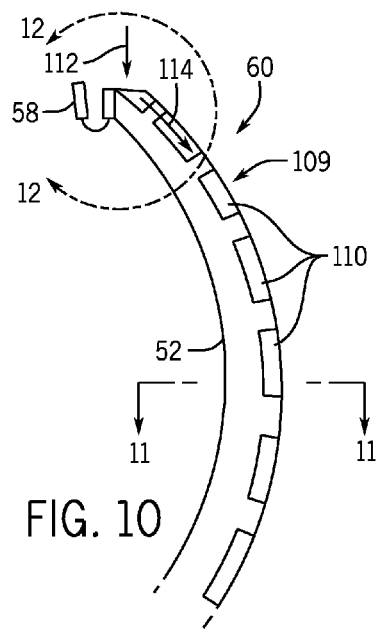
FIG. 10 is a side cross-sectional view of an embodiment of a needle having a track assembly and a gripping assembly.

FIG. 10 is a side cross-sectional view of one embodiment of the needle 52 having a track assembly 109 and the gripping assembly 58. As noted above, in some embodiments, rather than feeding the strap 42 directly through the slot 30 or the track assembly 89, 100 of the forward plunger 26, the strap feeding assembly 44 feeds the strap 42 from the first side 46 to the second side 48 of the baling chamber 14 through the track assembly 109 disposed within or coupled to the needle 52. As shown in FIG. 9, the track assembly 109 extends along a length of the needle 52. Additionally, the track assembly 109 may be segmented along the length of the needle 52 (e.g., the track assembly 109 may be discontinuous and may include multiple segments 110 disposed along the length of the needle). Alternatively, a continuous track assembly 109 having a curvature that substantially corresponds to the curvature of the needle 52 may be provided within the needle 52.

As noted above, in certain embodiments, the needle 52 may have a curvature and thus the track assembly 109 may be disposed along the length of the needle 52 as multiple segments 110 (e.g., a segmented track assembly) to enable the track assembly 109 to follow the curvature of the needle 52. Each segment 110 of the track assembly 109 may have a gate similar to the gate 104 described above with respect to FIG. 7 to retain the strap within the segments 110. In such configurations, the strap feeding assembly 44 may propel the strap 42 through the track assembly 109 of the needle 52 to the rotating gripper assembly 62 on the second side 48 of the baling chamber 14 to prepare for strapping another bale. For example, rather than directing the strap 42 from the first side 46 to the second side 48 of the baling chamber 14 through the slot 30 of the forward plunger 26, as shown in FIG. 5, the strap feeding assembly 44 may direct the strap 42 into the track assembly 109 of the needle 52. For example, the strap feeding assembly 44 may direct the strap 42 into the track assembly 109 as shown by arrow 112. The strap 42 may travel along the needle 52 through the segments 110 as shown by arrow 114.

Figure 11:
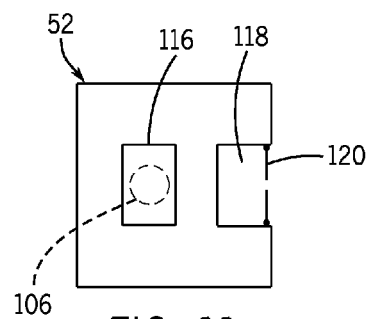
FIG. 11 is a top cross-sectional view of the needle of FIG. 10 taken along lines 11-11, illustrating a cavity for a cable and a track assembly.

FIG. 11 is a top cross-sectional view of an embodiment of the needle 52 of FIG. 10 taken along line 11-11. As shown, the needle 52 has multiple paths extending through the cross-section. Such a configuration may enable the needle 52 to have both the track assembly 109 and the actuation mechanism, such as the cable 106, for actuating the gripping assembly 58. As illustrated, the needle 52 includes a cavity 116 extending along the length of the needle 52 between the attachment 54 and the gripping assembly 58. The cavity 116 is configured to support the cable 106. The cavity 116 may fully or partially surround the circumference of the cable 106. Further, the needle 52 includes an opening (e.g., a slot) 118 extending along the length of the needle 52, or at least along a portion of the length of the needle 52 to support the track assembly 109 similar to the track assembly 89. As described above with reference to FIG. 7, the opening 118 of the needle 52 may directly support one or more gates 120. Alternatively, the opening 118 may support a self-contained track assembly 109, similar to the track assembly 100 of FIG. 8. The track assembly 109 and the gates 120 may have similar features to the track assemblies 89, 100 disposed within the slots 30.

Figure 12:
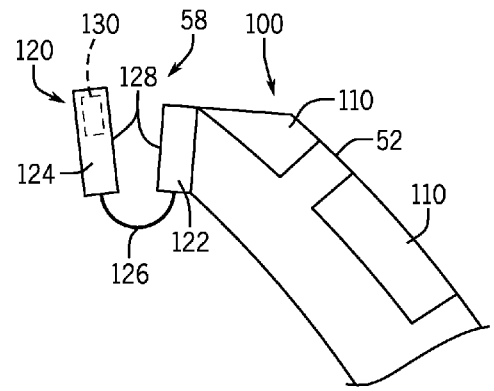
FIG. 12 is a side cross-sectional view of an end of the needle of FIG. 10, taken within 12-12, illustrating a gripping assembly.

FIG. 12 is a side cross-sectional view of the second end 60 of the needle 52 of FIG. 10, taken within lines 12-12. In some embodiments, the needle 52 may taper along its length or have a tapered portion at or near the second end 60. The gripping assembly 58 may include any suitable gripping device and may be coupled to the needle 52 in any suitable manner. For example, as shown in FIG. 12, the gripping assembly 58 is disposed near (e.g., proximal) the second end 60 of the needle 52. As shown, the gripping assembly 58 includes a "duck-bill" gripper 120 having a bottom portion 122 and a top portion 124 coupled to one another by a connector 126 (e.g., hinge). In some embodiments, the bottom portion 122 may be directly attached (e.g., integrated, secured to, etc.) to the needle 52, and may be stationary (e.g., may not move relative to the needle 52) as the top portion 124 moves (e.g., opens or closes) about the hinge 126. As discussed above, when the strap 42 contacts the gripping assembly 58, the hinge 126 enables the top portion 124 to grip the strap 42 between gripping surfaces 128. In some embodiments, one or both of the gripping surfaces 128 may be textured (e.g., grooved, knurled, toothed, etc.) to facilitate gripping the strap 42. Additionally, as described above, the gripping assembly 58 may include a sensor 130 configured to sense contact with the strap 42 or placement of the strap 42 within the gripping assembly 58, and the gripping assembly 58 may be configured to automatically close upon detection of the strap 42. Although shown in the top portion 124, it should be understood that the sensor 130 may be disposed on the gripping assembly 58 in any suitable position or may be coupled to the gripping assembly 58 in any suitable manner.

Figure 13:
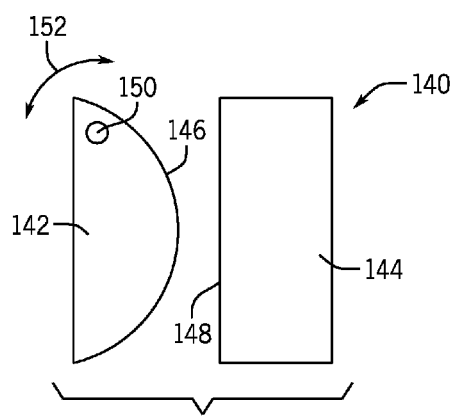
FIG. 13 is a side view of an embodiment of a semi-circular gripper configured to grip a strap.

Although the gripping assembly 58 of the needle and the rotating gripper assembly 62 may each include a duck-bill gripper 120, such as the gripper 120 shown in FIG. 12, any suitable gripper configuration may be utilized within the gripping assembly 58 and/or the rotating gripper assembly 62. For example, FIG. 13 is a side view of an embodiment of a semi-circular gripper 140 that may be utilized in accordance with the present disclosure. In the depicted embodiment, the semi-circular gripper 140 includes a first portion 142 and a second portion 144. The strap 42 may be gripped by the curved gripping surface 146 of the first portion 142 and the gripping surface 148 of the second portion 144 as the strap 42 is fed (e.g., received) between the first and second portions 142, 144. One or both of the gripping surfaces 146, 148 may be textured (e.g., grooved, knurled, toothed, etc.) to facilitate gripping the strap 42. The semi-circular gripper 140 is configured to rotate about a hinge 150, which may be disposed in any suitable location to facilitate rotation of the semi-circular gripper 140. In certain embodiments, the hinge 150 may be located within the first portion 142 as shown in FIG. 12, and the semi-circular gripper 140 may be configured to rotate about the hinge 150 as indicated by arrow 152. In certain embodiments, the semi-circular gripper 140 may be mounted on a spring (e.g., torsion spring), and thus, the semi-circular gripper 140 may rotate about the hinge 150 due to a force applied by the strap 42. In other embodiments, the semi-circular gripper 140 may be actuated, such that the rotation is driven by electrical power, for example. As discussed above, any suitable type of gripper may be incorporated into the gripping assembly 58 of the needle 52 and/or the rotating gripper assembly 62. However, in certain embodiments the gripping assembly 58 includes a duck-bill gripper 120, while the rotating gripper assembly 62 includes a semi-circular gripper 140.

Figure 14:
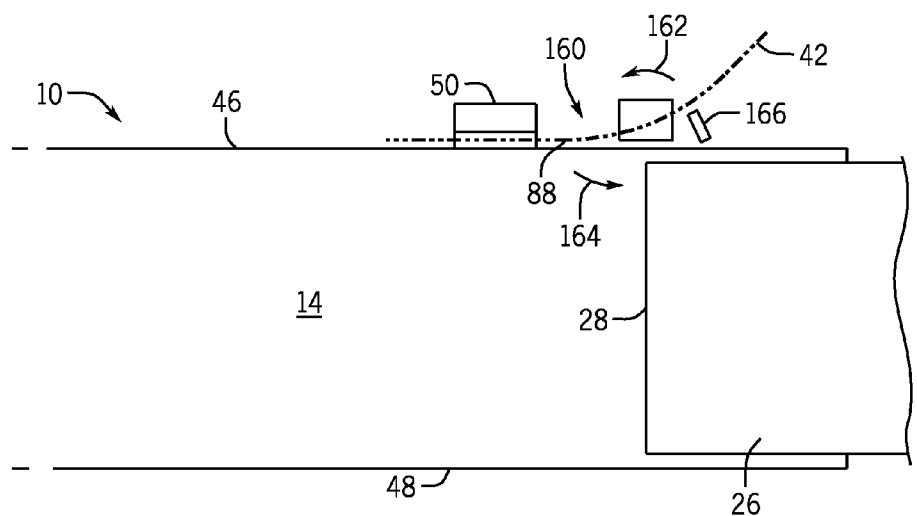
FIG. 14 is a side cross-sectional view of an embodiment of a baler having an orientating gripper disposed on a first side of the baling chamber.

FIG. 14 is a side cross-sectional view of an embodiment of a baler having an orientating gripper 160 disposed on a first side 46 of the baling chamber 14. The orientating gripper 160 is configured to rotate the free end 88 of the strap 42 after the strap 42 is sealed and cut by the sealing assembly 50. In certain embodiments, it may be desirable to provide an orientating gripper 160 on the first side 46 of the baling chamber 14. For example, rotating the free end 88 of the strap 42 may enable the strap 42 to be fed from the first side 46 to the second side 48 of the baling chamber 14 via the slot 30. In other embodiments, as described below, the orientating gripper assembly 160 may be configured to direct and/or to position the free end 88 of the strap 42 to facilitate gripping of the free end 88 by the gripping assembly 58 of the needle 52.

With the foregoing in mind, as shown in FIG. 14, the orientating gripper assembly 160 is disposed on the first side 46 of the baling chamber 14. The orientating gripper assembly 160 is configured to rotate from a first orientation to a second orientation as shown by arrow 162, and through such rotation, the orientating gripper assembly 160 may orient (e.g., rotate) the free end 88 of the strap 42 toward the forward end 16 of the baling chamber 14 as shown by arrow 164. In some embodiments, a stop 166 may be provided forward of the orientating gripper 160 to block the forward movement of the free end 88 of the strap 42 beyond a desired position. In certain embodiments, the orientating gripper assembly 160 may rotate to generally align the free end 88 of the strap 42 with the slot 30 on the material-facing surface 28 of the forward plunger 26. Thus, as described above, the orientating gripper assembly 160 may enable the strap 42 to be fed from the first side 46 to the second side 48 of the baling chamber 14 via the slot 30. In other embodiments, as described below, the orientating gripper assembly 160 may be configured to direct and/or to position the free end 88 of the strap 42 to facilitate gripping of the free end 88 by the gripping assembly 58 of the needle 52.

In the illustrated embodiment, the orientating gripper assembly 160 is provided in lieu of the strap feeding assembly 44. Although in other embodiments, the orientating gripper assembly 160 may be provided in addition to the strap feeding assembly 44, and may generally be disposed between the strap feeding assembly 44 and the sealing assembly 50. In other embodiments, the orientating gripper assembly 160 may be generally disposed between the strap feeding assembly 44 and the slot 30 of the forward plunger 26, for example. In such cases, the strap 42 is fed from the strap feeding assembly 44 into the orientating gripper assembly 160.

Figure 15:
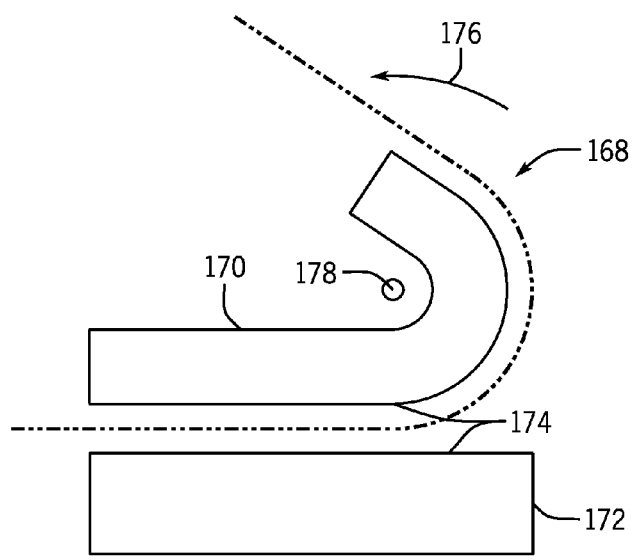
FIG. 15 is a side view of an embodiment of a J-shaped gripper configured to grip a strap.

The orientating gripper assembly 160 may have any suitable configuration and may include any suitable style gripper, including the duck-bill gripper 120 or the semi-circular gripper 140 described above with respect to FIGS. 12 and 13, respectively. FIG. 15 is a side view of an embodiment of a J-shaped gripper 168 configured to grip a strap 42. The J-shaped gripper 168 includes a first portion 170 and a second portion 172 configured to grip the strap 42 between gripping surfaces 174. One or both of the gripping surfaces 174 may be textured (e.g., grooved, knurled, toothed, etc.) to facilitate gripping the strap 42. The J-shaped gripper 168 may be configured to rotate from a first orientation to a second orientation as indicated by arrow 176. In particular, the J-shaped gripper 168 may rotate about a hinge or point 178. When utilized in the orientating gripper assembly 160, the J-shaped gripper 168 may orient the free end 88 of the strap 42 toward the forward end 16 of the baling chamber 14, thus facilitating feeding the strap 42 through the slot 30 of the forward plunger 26, for example.

Figure 16:
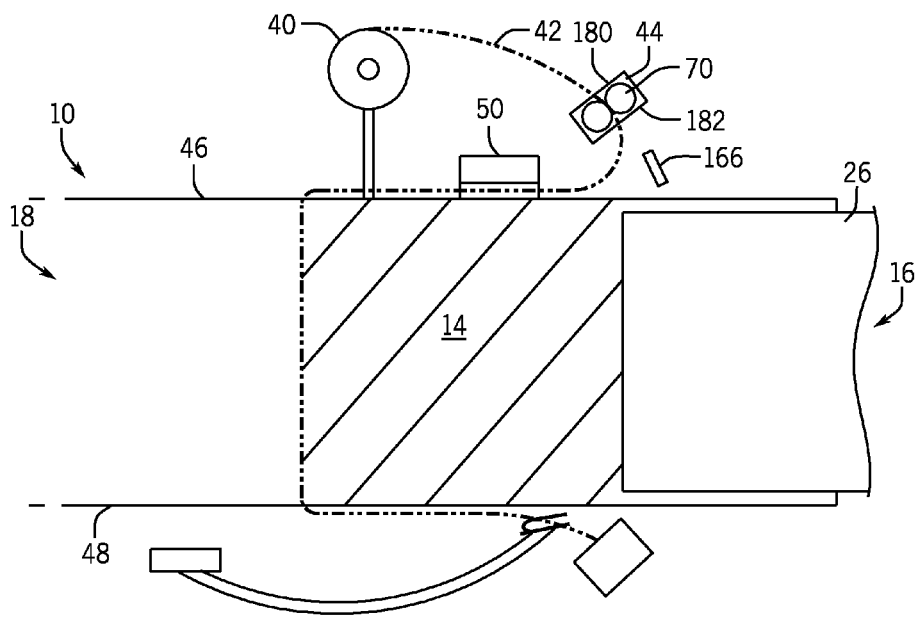
FIG. 16 is a side cross-sectional view of an embodiment of a baler having a strap feeding assembly configured to orient a free end of a strap toward a forward end of the baling chamber.
Figure 17:
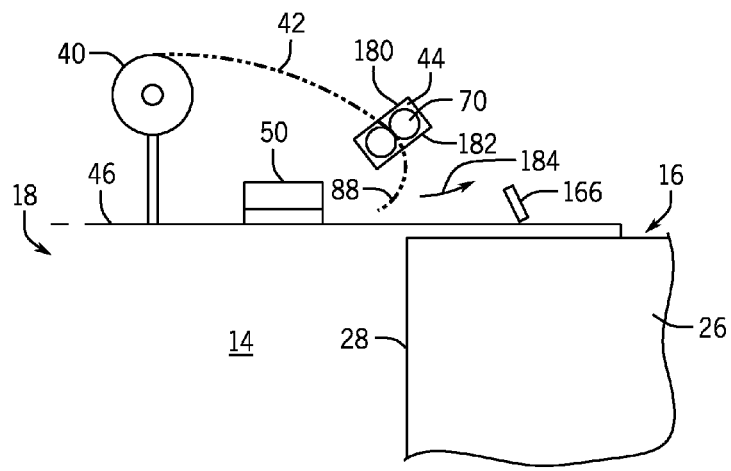
FIG. 17 is a side cross-sectional view of the baler of FIG. 16 after the strap is cut by a sealing assembly, depicting the free end of the strap oriented toward the forward end of the baling chamber.

FIG. 16 is a side cross-sectional view of an alternate embodiment of a baler 10 having a strap feeding assembly 44 configured to orient a free end 88 of a strap 42 toward a forward end 16 of the baling chamber 14. In the illustrated embodiment, the spool 40 and/or the strap feeding assembly 44 are positioned such that the strap 42 is automatically oriented towards the forward end 16 of the baling chamber 14 after the strap 42 is cut. As shown, the spool 40 is disposed rearward of the strap feeding assembly 44. The strap feeding assembly 44 is oriented to enable the strap 42 to be received at a first, rear-facing surface 180, and to enable the strap 42 to exit the strap feeding assembly 44 at a second, front-facing surface 182. FIG. 17 is a side cross-sectional view of the baler of FIG. 16 after the strap 42 is cut by a sealing assembly 50, depicting the free end 88 of the strap 42 oriented toward the forward end 16 of the baling chamber 14. Thus, after the bale is strapped and the sealing assembly 50 cuts the strap 42, the free end 88 of the strap 42 automatically moves (e.g., arcs, rotates) forward as indicated by arrow 184 toward the forward end 16 of the baling chamber 14. The motion of the free end 88 of the strap 42 may be due, at least in part, to the stiffness of the strap 42. As described above, such a position and/or orientation of the free end 88 enables the strap feeding assembly 44 to propel the strap 42 from the first side 46 to the second side 48 of the baling chamber 14. In certain embodiments, a stop 166 (e.g., rest) may be provided on the first side 46 of the baling chamber 14 forward of the strap feeding assembly 44 to block the forward movement of the free end 88 of the strap 42, and to suitably position the free end 88 of the strap 42 for the next stage of the baling process (e.g., to feed the strap 42 through the slots 30).

Figure 18:
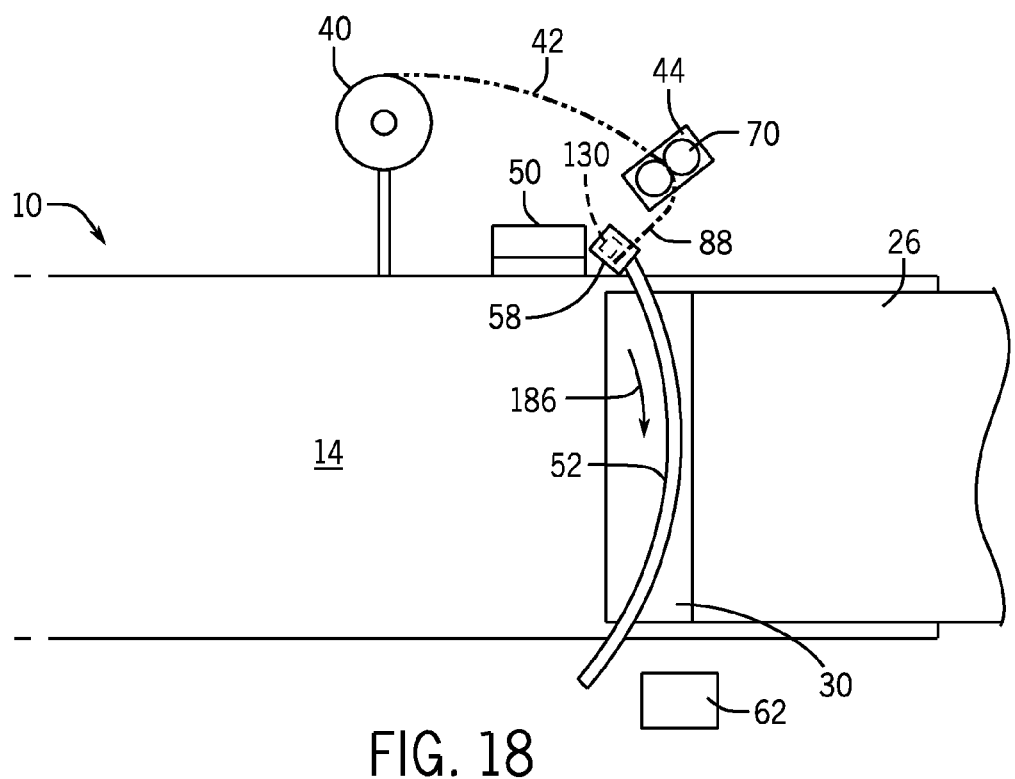
FIG. 18 is a side cross-sectional view of an embodiment of a baler configured to transfer a free end of a strap from a first side of the baling chamber to a second side of the baling chamber via a needle.

The embodiments described above generally relate to the baler 10 that is configured to feed the strap 42 from the first side 46 to the second side 48 of the baling chamber 14 via the slot 30 formed on the material-facing surface 28 of the forward plunger 26 or via the track assembly 109 within the needle 52. However, in certain embodiments, it may be desirable for the strap 42 to be transferred (e.g., moved, pulled, carried, etc.) from the first side 46 to the second side 48 of the baling chamber 14 by the gripping assembly 58 of the needle 52. In such embodiments, the baler 10 may not require track assemblies 89, 100, 109 to direct the strap 42 through the baling chamber 14. FIG. 18 is a side cross-sectional view of an embodiment of the baler 10 configured to transfer the strap 42 from the first side 46 to the second side 48 via the gripping assembly 58 of the needle 52.

As shown in FIG. 18, after the strap 42 is sealed and cut by the sealing assembly 50, the free end 88 of the strap 42 may be held and/or recaptured and gripped by the gripping assembly 58 of the needle 52. In other words, the needle 52 may be configured to grip the strap 42 on the first side 46 of the baling chamber 14 after the strap 42 is cut. In certain embodiments, the strap feeding assembly 44 may be oriented as shown in FIGS. 2-5 and the strap feeding assembly 44 may be configured to feed or direct the strap 42 into the gripping assembly 58 of the needle 52. In other embodiments, the strap feeding assembly 44 may be oriented as shown in FIGS. 16 and 17, so that the free end 88 of the strap 42 automatically faces (e.g., rotates) forward after being cut. Such a configuration may enable the gripping assembly 58 to grip the free end 88 of the strap 42 more easily. In some embodiments, the orientating gripper assembly 160 may rotate the free end 88 of the strap 42 toward the forward end of the baler 10 to place the free end 88 of the strap 42 into the gripping assembly 58 and to enable the gripping assembly 58 of the needle 52 to grip the strap 42. As noted above, the gripping assembly 58 may include the sensor 130 configured to sense contact with the strap 42 or placement of the strap 42 within the gripping assembly 58, and the gripping assembly 58 may be configured to automatically close upon detection of the strap 42. As discussed above with respect to FIG. 9, the gripping assembly 58 may be actuated, such as via the cable 106 disposed within the hollow needle 52. Regardless of the manner in which the gripping assembly 58 captures and/or grips the free end 88 of the strap 42 on the first side 46 of the baling chamber 14, once the strap 42 is gripped, the needle 52 may move (e.g., arc, rotate, etc.) downwardly through the baling chamber 14 from the first side 46 to the second side 48 as indicated by arrow 186. Thus, the needle 52 may be configured to transfer the free end 88 of the strap 42 from the first side 46 to the second side 48 of the baling chamber 14 and to extend the strap 42 through the baling chamber 14 to prepare for strapping additional material into subsequent bales.

In some embodiments, the needle 52 may be configured to transfer the strap 42 to the rotating gripper assembly 62 disposed on the second side 48 of the baling chamber 14. Such a configuration may substantially reduce or eliminate the possibility of the strap 42 becoming tangled or twisted about the needle 52 as the material collects in the baling chamber 14 and pushes the strap 42 rearwardly. In such cases, as the material collects in the baling chamber 14, the rotating gripper assembly 62 may rotate and transfer (e.g., retransfer) the strap 42 to the gripping assembly 58 of the needle 50. After the gripping assembly 58 receives the strap 42 from the rotating gripper assembly 62, the bale may be strapped as described above with respect to FIGS. 3 and 4. In particular, once the bale reaches a desired size and/or density, the needle 52 may move through the baling chamber 14 from the second side 48 to the first side 46, and transfer the strap 42 to the sealing assembly 50, where the strap 42 may be sealed into a loop around the bale.

Alternatively, rather than the separate rotating gripper assembly 62, the needle 52 may retain the strap 42 as the material collects in the baling chamber 14. In such cases, it may be desirable for the gripping assembly 58 disposed near the second end 60 of the needle 52 to be configured to rotate. Thus, the gripping assembly 58 may be able to rotate to accommodate the movement of the strap 42 as the strap 42 is pulled rearwardly by the material collecting in the baling chamber 14. In such cases, a separate rotating gripper assembly 62 may be obviated.

Figure 19:
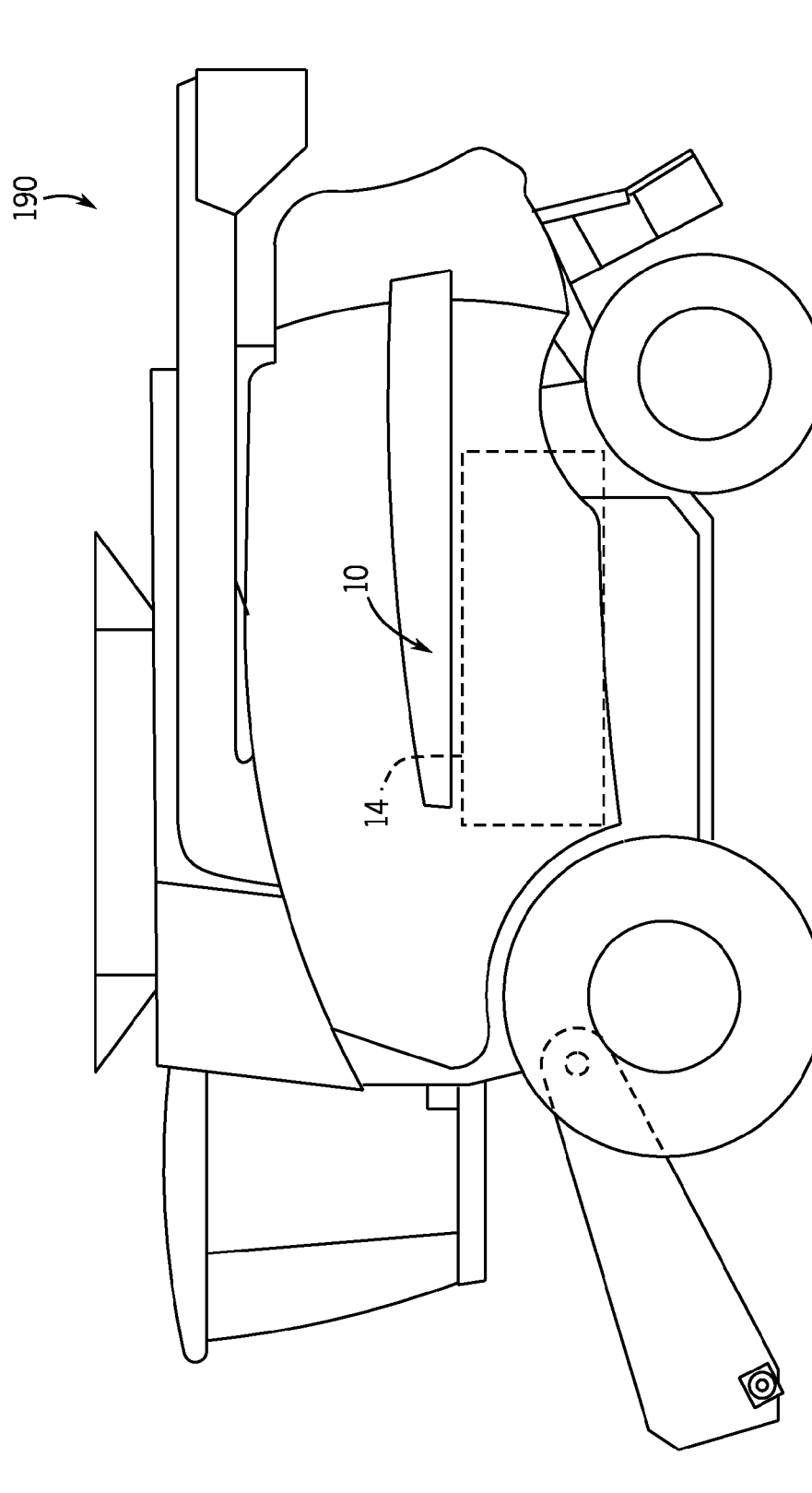
FIG. 19 is a side view of an embodiment of a self-contained vehicle including the baler.

FIG. 19 is a side view of an embodiment of a self-contained vehicle 190 including the baler 10. As illustrated, the baling chamber 14 is supported and/or mounted within or on the self-contained vehicle 190. The material may flow into the baling chamber 14 via a conveyance system, where the material is baled in a manner described above. Thus, the baler 10 may be configured to collect and bale material as the self-contained vehicle 190 travels through the field.

Figure 20:
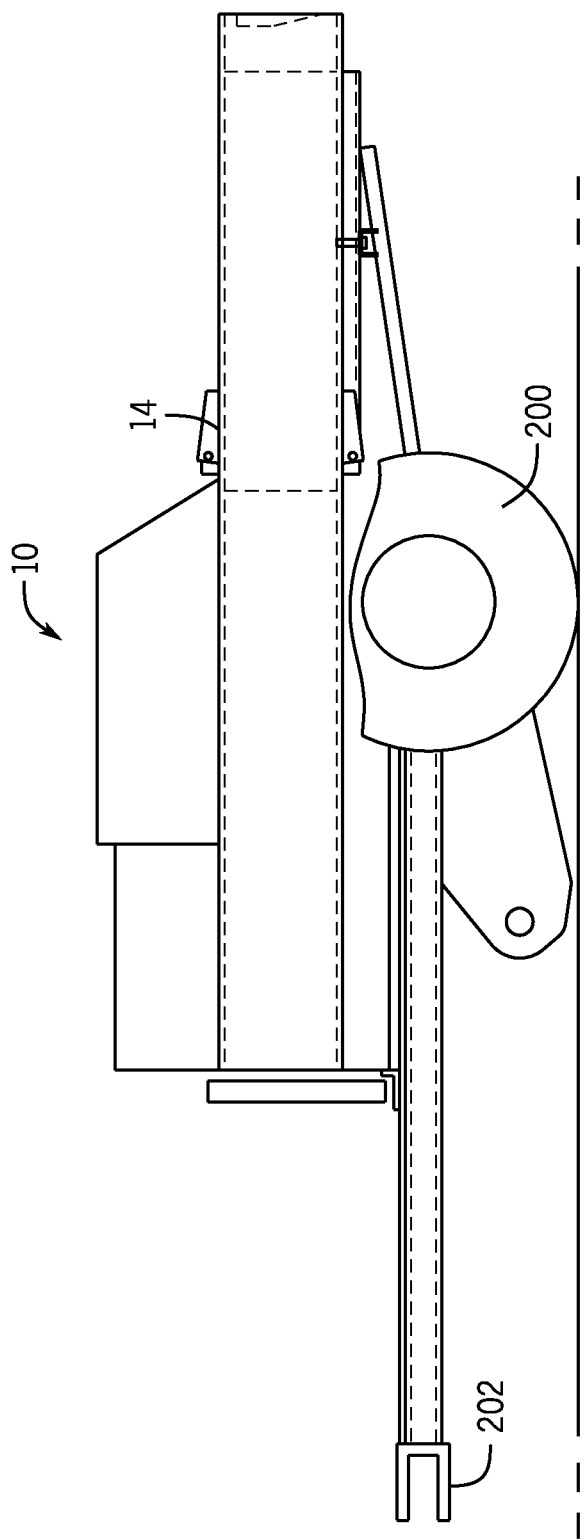
FIG. 20 is a side view of an embodiment of the baler configured to be towed by a tow-vehicle.

FIG. 20 is a side view of an embodiment of a towed implement having the baler 10. As shown, the baler 10 includes a baling chamber 14. The baler 10 may be ground-supported by wheels 200 and may be coupled to a tow vehicle (e.g., a harvester, a tractor, etc.) by a projection 202 that is configured to connect the baler 10 to the tow vehicle. Thus, the baler 10 may be part of the towed implement and pulled through a field. In such a configuration, the baler 10 collects and bales material as the baler 10 travels through the field behind the tow vehicle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A strapping system for an agricultural implement comprising:
   a strap feeding assembly positioned on a first side of a baling chamber;
   a rotating gripper assembly positioned on a second side of the baling chamber, opposite the first side;
   a track assembly configured to direct a strap from the strap feeding assembly to the rotating gripper assembly; and
   a needle positioned on the second side of the baling chamber and included a gripping assembly configured to receive and to capture the strap,
   wherein the rotating gripper assembly is configured to grip the strap while the rotating gripper assembly is in a first orientation for receiving the strap, and while the rotating gripper is in a second orientation that enables crop flow in a rearward direction to draw the strap through the strap feeding assembly, and
   wherein the rotating gripper assembly is configured to transfer the strap to the gripping assembly of the needle while the rotating gripper assembly is in the second orientation.

2. The strapping system of claim 1, wherein the track assembly is disposed within a slot formed on a material-facing surface of a forward plunger.

3. The strapping system of claim 2, wherein the track assembly comprises a gated channel.

4. The strapping system of claim 1, wherein the track assembly is disposed within a needle.

5. The strapping system of claim 1, wherein the strap feeding assembly is configured to propel the strap through the track assembly to the rotating gripper assembly.

6. The strapping system of claim 1, wherein the rotating gripper assembly comprises a semi-circular gripper configured to grip the strap.

* * * * *